United States Patent
Uribe et al.

(10) Patent No.: US 6,818,341 B2
(45) Date of Patent: Nov. 16, 2004

(54) FUEL CELL ANODE CONFIGURATION FOR CO TOLERANCE

(75) Inventors: Francisco A. Uribe, Los Alamos, NM (US); Thomas A. Zawodzinski, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 13 days.

(21) Appl. No.: 09/848,823

(22) Filed: May 3, 2001

(65) Prior Publication Data

US 2002/0119363 A1 Aug. 29, 2002

Related U.S. Application Data

(63) Continuation-in-part of application No. 09/216,313, filed on Dec. 18, 1998, now abandoned.

(51) Int. Cl.[7] .......................... H01M 4/90; H01M 4/92; H01M 8/10
(52) U.S. Cl. ............................. 429/42; 429/30; 429/40; 429/44
(58) Field of Search .............................. 429/30, 40, 41, 429/42, 44

(56) References Cited

U.S. PATENT DOCUMENTS

| | | | |
|---|---|---|---|
| 5,658,681 A | 8/1997 | Sato et al. | 429/13 |
| 5,672,439 A | 9/1997 | Wilkinson et al. | 429/40 |
| 5,863,673 A | 1/1999 | Campbell et al. | 429/44 |
| 5,939,220 A | 8/1999 | Gunner et al. | 429/40 |
| 5,955,214 A | 9/1999 | Bellows et al. | 429/17 |

FOREIGN PATENT DOCUMENTS

| | | | |
|---|---|---|---|
| JP | 8-188783 | * | 7/1996 |
| JP | 2000-262899 | * | 9/2000 |

OTHER PUBLICATIONS

Eguchi, K., et al., "Removal of CO from Methanol Reforming Gas by Low Temperature Shift Reaction," Studies in Surface Science and Catalysis 121 (Science and Technology in Catalysis 1998), 445–448, 1999.*

Uchida et al., "Solid Polymer type Fuel Battery," Publication Date, Aug. 9, 1996, translation of JP 8–203537.

* cited by examiner

Primary Examiner—Jonathan Crepeau
(74) Attorney, Agent, or Firm—Ray G. Wilson

(57) ABSTRACT

A polymer electrolyte fuel cell (PEFC) is designed to operate on a reformate fuel stream containing oxygen and diluted hydrogen fuel with CO impurities. A polymer electrolyte membrane has an electrocatalytic surface formed from an electrocatalyst mixed with the polymer and bonded on an anode side of the membrane. An anode backing is formed of a porous electrically conductive material and has a first surface abutting the electrocatalytic surface and a second surface facing away from the membrane. The second surface has an oxidation catalyst layer effective to catalyze the oxidation of CO by oxygen present in the fuel stream where at least the layer of oxidation catalyst is formed of a non-precious metal oxidation catalyst selected from the group consisting of Cu, Fe, Co, Tb, W, Mo, Sn, and oxides thereof, and other metals having at least two low oxidation states.

4 Claims, 6 Drawing Sheets

FUEL CELL ANODE CONFIGURATION FOR CO TOLERANCE

RELATED APPLICATIONS

This application is a continuation-in-part of U.S. patent application Ser. No. 09/216,313, filed Dec. 18, 1998, now abandoned, and claims the benefit thereof.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

This invention relates to polymer electrolyte fuel cells, and, more particularly, to polymer electrolyte fuel cells suitable for operation with hydrogen reformate from a gas or liquid fuel supply.

BACKGROUND OF THE INVENTION

Practical fuel cells based on perfluorinated ionomer membranes (e.g., Nafion™) use reformed fuel as a primary source for the anode feed material. The reformate, besides hydrogen, may contain trace amounts of carbon monoxide (CO, from a few to hundreds ppm), whose presence is detrimental to the cell performance. Energy conversion in fuel cells typically depends on highly dispersed carbon-supported Pt, which catalyzes hydrogen electro-oxidation. However, CO strongly adsorbs on the Pt surface leading to a decrease of the Pt active surface area available for hydrogen oxidation, and, consequently, to losses in electrical current that are unacceptable for a practical device.

There have been various approaches attempting to achieve full CO tolerance in fuel cell performance. Full tolerance is typically defined as voltage losses no greater than 5% at any cell current in the presence of CO relative to that in its absence. For instance, binary or ternary Pt alloy-based catalysts have been tested. The alloy metals act as promoters of CO electro-oxidation and stripping. However, not even the best known of these catalysts, such as Pt—Ru alloys, are able to totally eliminate the detrimental effects of higher trace CO concentrations (>100 ppm) at 80° C.

A second direction has been to increase the cell operating temperature above 100° C. In polymer electrolyte fuel cells (PEFCs), this approach has been successful only for relatively short periods of time. At 120° C., the sticking of CO onto Pt decreases enough to maintain the hydrogen electro-oxidation rate without significant losses. But higher operating temperatures bring additional problems to ordinary PEFCs, such as catalyst layer instability and ionomer membrane dehydration. These effects cause relatively rapid deterioration of the cell performance.

The best approach known so far is to bleed a small amount of air into the anode along with the fuel stream as described in U.S. Pat. No. 4,910,099, issued May 20, 1990, to Gottesfeld, incorporated herein by reference. Oxygen from the air is able to oxidize the CO adsorbed on the catalyst layer to $CO_2$, which is released from the catalyst. The air cleans Pt sites, making them available for $H_2$ electro-oxidation at an acceptable rate. Nevertheless, there are limits on how much air can be permitted into the cell without sacrificing fuel efficiency since oxygen in the air combines with the hydrogen fuel gas. Also, safety becomes an issue because of the potential explosive hazard presented by $H_2/O_2$ mixtures with increasing amounts of $O_2$. These considerations indicate that injecting the minimum effective amount of air for a given content of CO is the most desirable condition for this approach.

U.S. patent application Ser. No. 09/216,313, filed Dec. 18, 1998, now abandoned, incorporated herein by reference, describes a new anode configuration that makes the air bleeding considerably more efficient in reaching CO-tolerance to levels of the order of 100 ppm, and with the concomitant advantage of lowering the total anode precious metal catalyst loading. The precious metal-based anode catalyst was distributed in two separate sections in the fuel cell. One fraction was pressed onto the polymer electrolyte membrane and the rest was placed on one side of the anode backing carbon cloth facing away from the membrane. The function of the catalyst on the backing was to allow the chemical oxidation of a CO impurity by $O_2$ from the air bleeding at a distance from the electrocatalytic reaction. In this way, poisoning was avoided because CO was eliminated from the $H_2$ fuel stream before $H_2$ reaches the electrochemical catalyst layer where $H_2$ electrochemical oxidation, the power generating process, takes place.

The present invention addresses the problem of reducing the level of CO in reformate fuel gas to acceptable levels using low cost, readily available non-precious metals. Novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

This invention may comprise a polymer electrolyte fuel cell (PEFC) usable in a reformate fuel stream containing diluted hydrogen fuel with CO as an impurity and with added air. A polymer electrolyte membrane has an electrocatalytic surface formed from an electrocatalyst mixed with the polymer and bonded on the anode side of the membrane. An anode backing is formed of a porous electrically conductive material and has a first surface abutting the electrocatalytic surface and a second surface facing away from the membrane. The second surface has an oxidation catalyst layer effective to catalyze the oxidation of CO by oxygen present in the fuel stream where the layer of oxidation catalyst is formed of a non-precious metal oxidation catalyst selected from the group consisting of Cu, Co, Fe, Tb, W, Mo, Sn, and oxides thereof.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
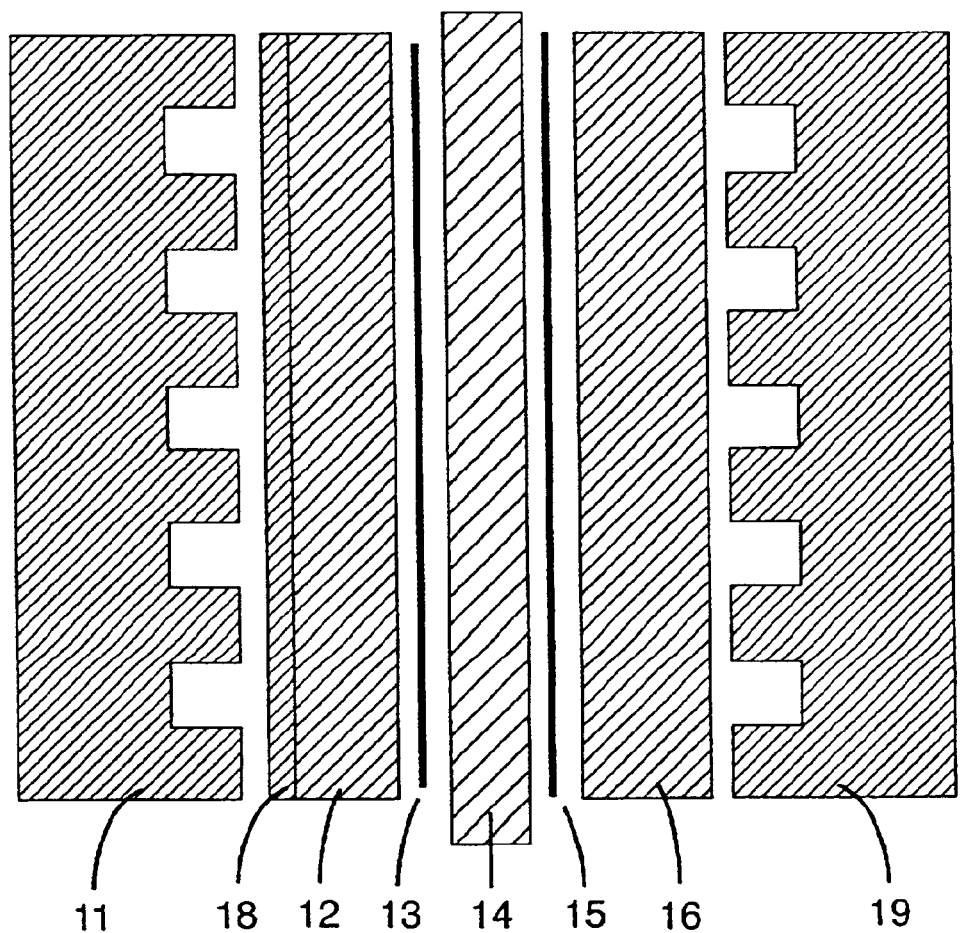
FIG. 1 is an exploded cross-section of one embodiment of a CO tolerant fuel cell according to the present invention.

In accordance with the present invention, shown in FIG. 1, an anode is based on a catalyzed membrane 14 prepared according to the LANL thin-film catalyst technology described in the '984 and '777 Wilson patents, supra, and U.S. patent application Ser. No. 09/715,211, filed Nov. 14, 2000, with an adjacent backing layer 12 that contains additional catalytic sites for effective CO oxidation. Membrane electrode assembly (MEA) 13, 14, 15 is prepared by application of Pt/C, or Pt alloy/C catalyst 13 to one side of ionomeric membrane 14 (anode catalyst ) and a PVC catalyst 15 to the other side of membrane 14 (cathode catalyst ). It will be understood that catalyst layers 13 and 15 are not separate structures, as shown in FIG. 1 for clarity, but are integral with membrane 14. Low loadings of catalyst 13 bonded to the anode side of membrane 14 (typically, 0.2 mgPt/cm$^2$ or less) in this way, enable effective operation with 100 ppm CO in reformate in conjunction with the anode structure described below. Reformate fuel gas is input through gas manifold 11 and air (oxygen) is input through gas manifold 19.

Anode backing 12 is used to provide support for the additional component of anode catalyst for effective CO oxidation. Backing 12 has the following properties:

- Contains a CO oxidation catalyst 18 not coated by ionomer, thus making catalyst sites easily available to both CO and $O_2$ molecules in the gas phase.
- Exhibits overall gas transport properties similar to those of ordinary, uncatalyzed backing layers used to date adjacent the catalyzed membrane.
- Exhibits good hydrophobic characteristics to prevent "flooding" of the backing in the presence of the high level of humidification required to achieve high conductivity in anode catalyst layer 13 (high humidification of the fuel feed stream is required to minimize losses in an anode operating with dilute hydrogen feed streams).

In accordance with the present invention, the catalyst layer is based in non-precious metals, with a concomitant reduction in the cost of this component by several orders of magnitude. As described above, the function of this layer is to provide a catalytic surface for the chemical oxidation of CO to $CO_2$ (by $O_2$ from air bleeding) at the relatively low operational temperatures of polymer electrolyte fuel cells (PEFCs) (80° C. or lower). This results in a CO-free reformate fuel stream that reaches the internal catalyst layer where the electrochemical oxidation of $H_2$ takes place.

Some non-precious metal catalysts are known to promote the conversion of CO (see, e.g., United Catalyst Inc. Catalog, Louisville, Ky.). However, these catalysts are usually used at much higher temperatures than 80° C., the PEFC operational temperature. For example CuO-based catalysts are typically employed in the range 204 to 260° C. Catalysts based on $Fe_2O_3$ are active in the range 345 to 450° C. There was no indication that these classes of catalysts would be useful for achieving CO tolerance in polymer electrolyte fuel cells.

A second unknown for using non-precious metals in fuel cells components, arises from the risk of catalyst corrosion that may allow these metals to leach into the internal catalyst layer and the membrane. Metal deposition on electrocatalytic Pt surfaces may poison the catalyst. Also, cations such as $Cu^{2+}$ and Fe may exchange $H^+$ at both the catalyst layer and at the membrane, affecting the cell conductivity, leading to poor fuel cell performance.

A third uncertainty for the use of upstream catalysts that promote the reaction $CO+O_2$ in these fuel cells is the prospect that the reaction $H_2+O_2$ may predominate, and thus lower the fuel efficiency without the expected benefit.

Finally, there is always the possibility of the reverse of the water-gas shift reaction. The presence of large amounts of $H_2$ and $CO_2$ (in the reformed fuel) may produce CO and water, making the CO poisoning more acute.

In accordance with the present invention, a number of non-precious metal based catalysts have been used successfully in achieve CO tolerance in PEFCs. There are a group of materials, mostly containing transition metal oxides, such as $Fe_2O_3$ and CuO, that can effectively function as an oxidation catalyst in a PEFC. For this reason, Cr, Mn, Co, La and Tb were investigated. Sn and Mo were also included, because Pt—Sn and Pt—Mo alloys are used in fuel cells as catalysts that tolerate low levels of CO (up to 10-20 ppm) without air bleeding.

Catalyst Materials and Preparation.

With the exception of 3 experiments, all of the active materials (metals and oxides) were obtained from chemical suppliers such as Alfa Aesar(JMC), Aldrich and Janssen. They were used as received. A catalyst containing a CuO/ZnO/$Al_2O_3$ composite (G66B™) was obtained from United Catalysts Inc. The catalyst pellets were ground in a mortar to make the ink. The catalyst that was designated as "Cu cat" is supplied by Engelhard, and is usually used as a glove box air and water getter.

One carbon-supported CuO catalyst designated as CuO (ac) was prepared by us as follows:

16.0 g Cu(II) acetate monohydrate(98%, Aldrich)
4.00 g Vulcan XC-72 carbon black
18.0 mL water 1. All the ingredients were mixed in a 150 beaker with a spatula until a uniform slurry was achieved.
2. Mixture sonicated for 10 minutes.
3. Bar stirred overnight.
4. Slow dried in air over a hot plate, with occasionally stirring with a spatula.
5. Heated in an oven at 280° C. for 20 minutes.
6. Powderized with a spatula and weighed.

It was assumed that heating in the air transformed all Cu(II) acetate into $CuO+CO_2+H_2O$. The estimated composition of this catalyst was 80% Cu and 20% Carbon. No further analysis of this catalysts was carried out.

As shown in FIG. 1, the non-precious metal based catalysts of layer 18 were placed onto one side of the anode backing 12, prepared as follows:

a) Catalyst Ink Preparation:

The active material (metal or oxide) was mixed with Carbon Black (Vulcan XC-72),a Teflon suspension, glycerol, and isopropanol. This mixture resulted in an ink that was brush painted onto the carbon cloth. The relative amounts of the active material and carbon were variable. The amount Teflon was adjusted to be about 8 to 10% by weight in the dry ink. This Teflon content produced, after sintering, a catalyst layer with good adhesion to the carbon cloth.

Example of Ink Composition:

0.40 g CuO powder
0.034 g Carbon black
1.9 mL polytetrafluoroethylene ("Teflon 120"™) suspension (0.02 g solids/mL)

1.0 mL isopropanol

The carbon black provided support and electronic conductivity to the catalyst composite. The Teflon acted as a hydrophobic binder in the dry ink after sintering. Glycerol and isopropanol provided suitable consistency and viscosity to the ink that allowed the ink to be painted onto a carbon cloth. All components were mixed in a vial, sonicated for 10 minutes and bar stirred for at least 2 hours.

b) External Catalyst Layer Preparation:

1. A carbon cloth from E-TEK, with polytetrafluoroethylene on only one side, was heated in the air in a furnace at 280° C. for 15 minutes, and then weighed.
2. A pre-weighed coat of ink was painted on the side of the carbon cloth that did not contain polytetrafluoroethylene and dried in an oven for about 120-130° C. for 10 minutes.
3. The cloth+dry ink was weighed again and the amount of active material per unit area was estimated. The calculated amount was only an approximation because the ink contained some glycerol that was not totally eliminated by heating at 130° C.
4. If a higher catalyst loading was necessary then steps 2 and 3 were repeated.
5. Once the right loading was achieved, the carbon cloth+ink was sintered in a furnace (in air) at 280° C. for 15 minutes. This step also eliminates residual glycerol and solvents.
6. After a final weight, the definitive loading of active material per unit area was calculated, assuming that the composite contains only the active material (metal or oxide), carbon, and polytetrafluoroethylene. It will be understood that the experimental protocol herein used painting to apply the oxidation catalyst to the anode backing layer, but this technique is not intended to be a limitation on the invention claimed herein. Well-known methods, such as spraying, decal transfer, and the like, may also be used.

RESULTS

Figure 2:
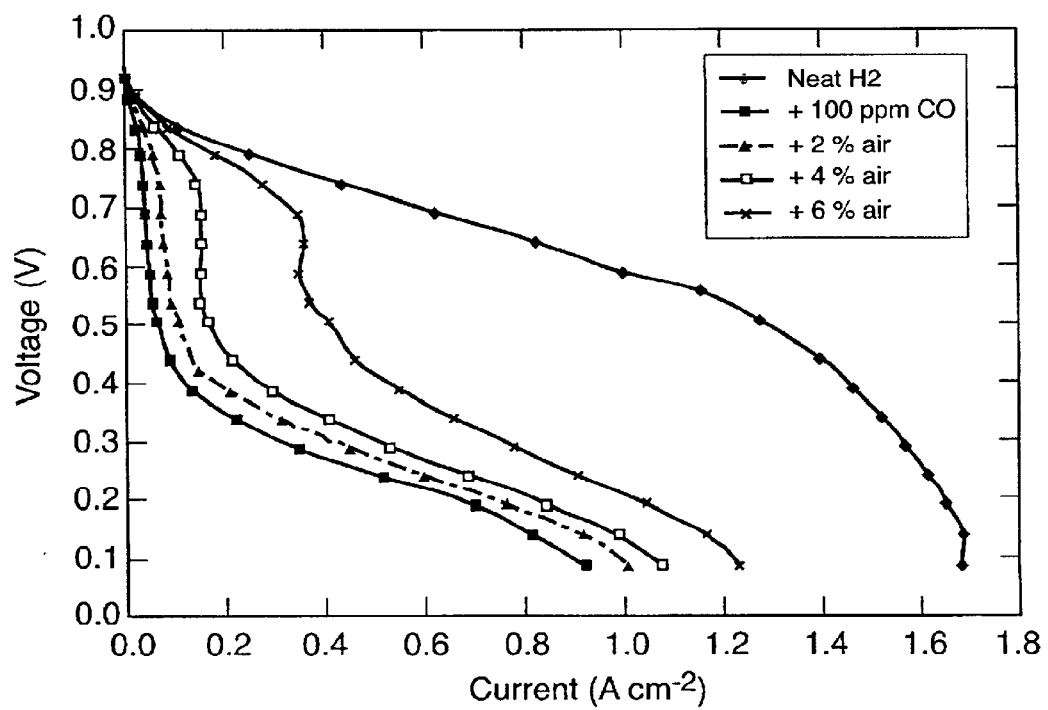
FIG. 2 depicts polarization curves of a fuel cell with a standard anode configuration.

PEFCs incorporating non-precious metal catalysts were prepared and operated with CO-contaminated $H_2$ or with simulated reformed fuels. FIG. 2 shows polarization curves obtained with a PEFC of 5 $cm^2$ size containing typical Pt electrocatalyst loading (ca. 0.2 mg/$cm^{-2}$) at both the anode and cathode in a standard configuration operated at 80° C. The cell was operated with various fuel compositions, including small amounts of air bleeding at the anode.

The cell performance losses when operating on $H_2$ containing 100 ppm CO were considerable. At a cell current of 0.6 A $cm^{-2}$ the voltage dropped more than 300 mV when a run with 6% air is compared with a run with neat $H_2$. This result shows that 100 ppm of CO impurity brings the standard cell to an impractical output even with air bleeding. In order to get acceptable performances with this standard cell configuration, a much higher Pt loading would be required (over 1 mg Pt/$cm^{-2}$). Certainly, this is not a viable solution to the CO-tolerance problem because of the cost of the precious metal.

Figure 3:
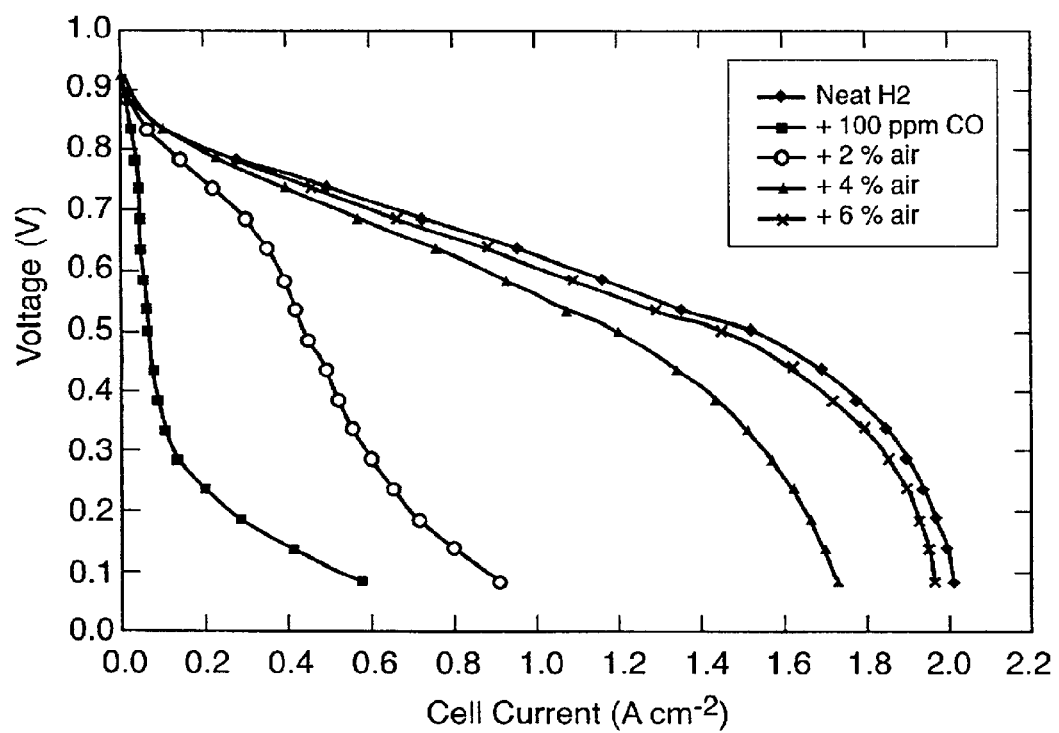
FIG. 3 depicts polarization curves of a fuel cell with an oxidation catalyst of CuO.

In contrast, FIG. 3 shows that a cell containing a reconfigured anode with a membrane Pt loading of 0.17 mg/$cm^{-2}$ and an anode catalyst layer of CuO can exhibit practically full tolerance to 100 ppm CO. With 4% and 6% air bleeding the performance losses at 0.6 A $cm^{-2}$ are no more than 20 mV. This is indeed a remarkable result when a simple cost analysis is done. The price of Cu is about 2 orders of magnitude less expensive than Pt. The cost is even more favorable for the non-precious metal if the cost of CuO is used.

Figure 4:
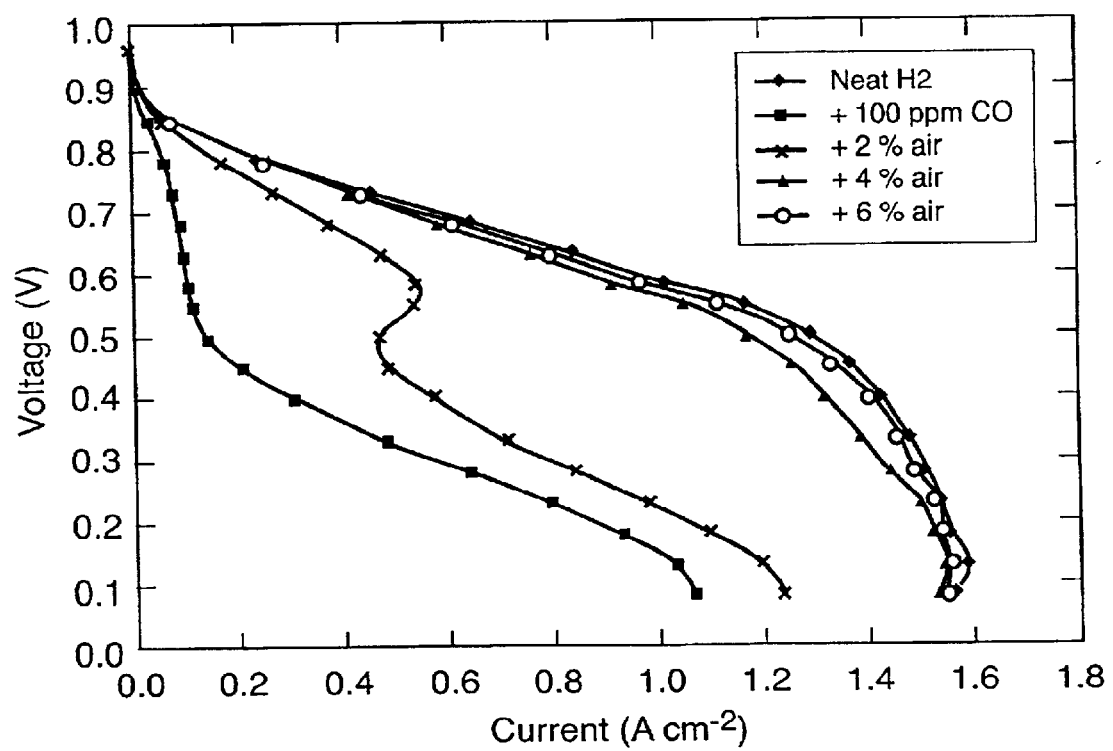
FIG. 4 depicts polarization curves of a fuel cell with an oxidation catalyst of $Fe_2O_3$.

There are several non-precious metal based catalysts that can be used in the reconfigured anode structures. FIG. 4 shows that a PEFC of 5 $cm^2$ size having a Pt electrocatalyst membrane loading of 0.20 mg $cm^{-2}$ and an anode oxidation catalyst loading of 0.32 mg $cm^{-2}$ $Fe_2O_3$ exhibits tolerance to 100 ppm CO equivalent to CuO. In this case the performance losses are almost negligible with 4% or 6%-air bleeding.

Figure 5:
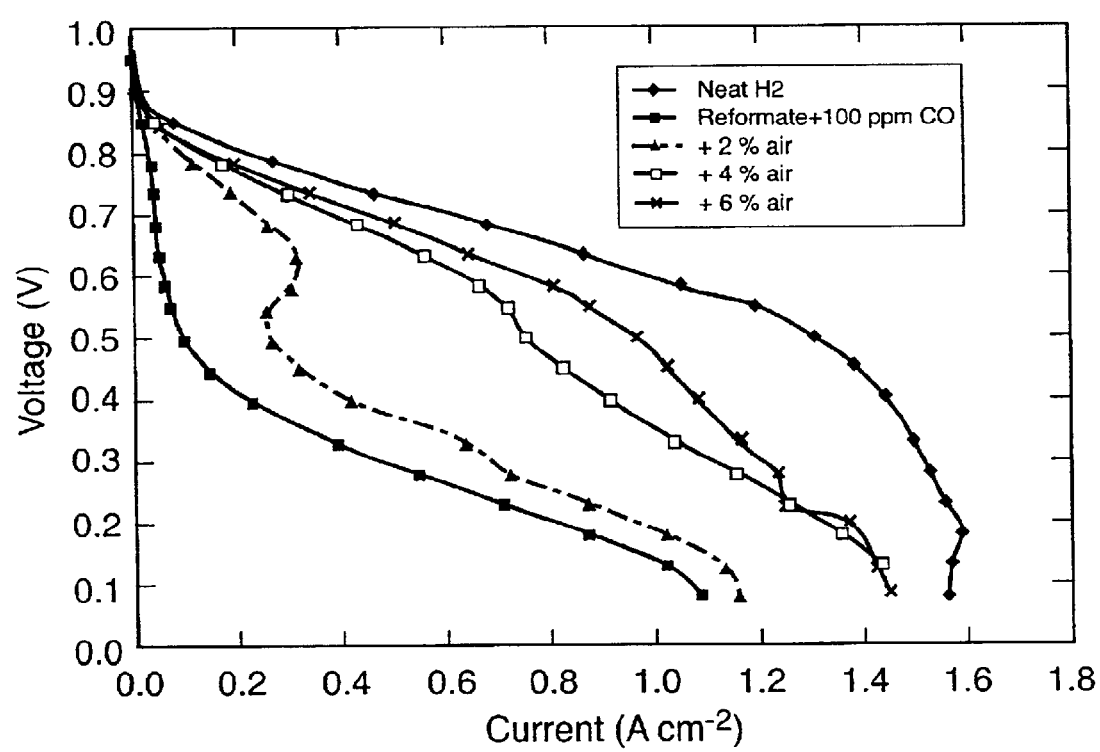
FIG. 5 depicts polarization curves of a fuel cell with an oxidation catalyst layer of $Fe_2O_3$ and operated with air and with reformate or $H_2$ fuel.

PEFCs with reconfigured anodes were also operated with simulated reformate. A typical simulated reformate for experimental use herein contained 40% $H_2$, 25% $CO_2$, 35% $N_2$ and 100 ppm CO. The same cell used to obtain the performance depicted in FIG. 4 presented only 100 and 60 mV losses at 0.6 A $cm^{-2}$ when operated with the reformate fuel composition and 4% and 6% air bleed, respectively, as shown in FIG. 5. The actual losses are even smaller if the dilution effect of $H_2$ in the reformate is taken into account.

Another very important property of these non-precious metal catalysts is the behavior in the simultaneous presence of large amounts of $CO_2$ and $H_2$ in the fuel. In the proper conditions, particularly at high temperatures, these two gases may react according to the inverse of the water-gas shift reaction producing $CO+H_2O$ and therefore leading to even a larger CO contamination. The presence of CuO and $Fe_2O_3$ catalysts did not show any evidence of promoting the inverse shift reaction.

Figure 6:
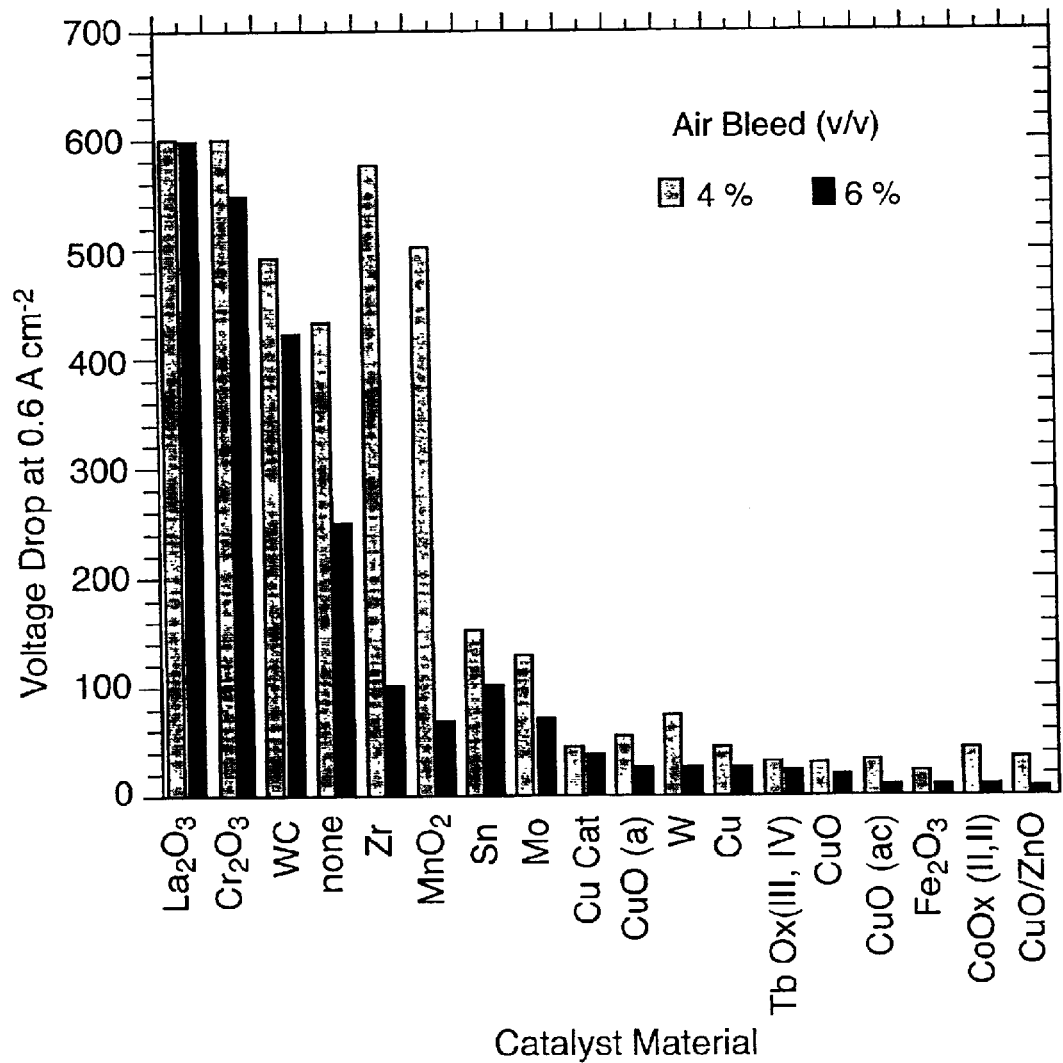
FIG. 6 graphically compares the performance of fuel cells with a variety of non-precious metal CO oxidation catalysts.

FIG. 6 shows the cell voltage difference between a cell operated at 80° C. with neat $H_2$ and with $H_2$+100 ppm CO+ Air bleeding. The voltage difference was measured at a cell current density of 0.6 A $cm^{-2}$ for several materials placed at the reconfigured anode external layer (see catalyst materials and preparation section). The materials are arranged in increasing order of CO tolerance. Notice that all the catalysts containing Cu are very active for CO oxidation at a cell operating temperature (80° C.) with air bleed as low as 4%. However, catalysts of the metals Sn, Mo, W, and Tb, and oxides of Fe and Co appear to be as effective as well, where effective means providing a voltage loss of about 150 mV or less at 0.6 A $cm^{-2}$ with no more than a 4% air bleed.

With the exception of CuO-based catalysts (prepared from Cu acetate), the actual nature of the active catalyst surfaces have not been studied. X-ray diffraction measurements on that CuO catalyst show that, besides CuO, the surface also contains $Cu_2O$. The simultaneous presence of Cu in two oxidation states may be important in their catalytic activity. Considering the preparation of the outer catalyst layer, which involves sintering in the air at 280°, it is highly probable that all the metals are at least partially in the form of oxides. From FIG. 6, the metals (or most probably the oxides) that promote the oxidation of CO more effectively, appear to be those in which the metal is present in two low oxidation states (1 to 4). In other words the catalyst predominantly contains at least two of the following oxides $M_2O$, MO, $M_2O_3$ and $MO_2$. (The oxidation state number is the number of electrons to be added or subtracted from an atom in a combined state to convert the atom to elemental form).

Examples of metals with at least two low oxidation states are Cu, Fe, Co, and Sn. This result is in agreement with the poor performance of Zr and $La_2O_3$; Zr and La have only one stable oxidation state (4 and 3 respectively). Cr and Mn on the other hand, may be found in much higher oxidation states (6 and 7 respectively) as chromates and permanganates. Border line metals are Mo and W, which show relatively good performance although they have stable oxidation states from 2 to 6.

Indeed, other non-precious metals, with two low stable oxidation states, such as Ni, TI, Pb, Eu, Ti, could be effective for CO tolerance. The first three of these metals have been excluded from consideration because of their known toxicity, but might be suitable for some PEFC applications.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A PEM fuel cell usable in a reformate fuel stream containing diluted hydrogen fuel with CO as an impurity and with added air, comprising:

a polymer electrolyte membrane having an electrocatalytic surface formed from an electrocatalyst mixed with the polymer and bonded on an anode side of the membrane; and an anode backing formed of a porous electrically conductive material and having a first surface abutting the electrocatalytic surface and a second surface facing away from the membrane, where the second surface has an oxidation catalyst layer effective to catalyze the oxidation of CO by oxygen present in the fuel stream where at least the layer of oxidation catalyst consists essentially of a non-precious metal oxidation catalyst selected from the group consisting of Cu, Fe, Co, Tb, W, Mo, Sn, and oxides thereof.

2. A PEM fuel cell system according to claim 1, where the electrocatalyst is selected from the group consisting of Pt and Pt/Ru alloy.

3. A PEM fuel cell system according to claim 1, wherein the electrocayalyst is Pt.

4. A PEM fuel cell system according to claim 1, wherein the layer of oxidation catalyst further includes a hydrophobic material.

* * * * *